United States Patent Office 3,824,169
Patented July 16, 1974

3,824,169
ION SELECTIVE ELECTRODE COMPRISING GOLD
Gerardus Wouter Serge van Osch, Utrecht, Jan Van Houwelingen, Leersum, and Anton Maarten Herman Weelink, Lichtenvoorde, Netherlands, assignors to Control Data Corporation, Minneapolis, Minn.
Filed Jan. 15, 1973, Ser. No. 323,696
Int. Cl. G01n 27/46
U.S. Cl. 204—195 M
23 Claims

ABSTRACT OF THE DISCLOSURE

An electrode assembly for detecting ions in solution having an ion-sensitive imporous membrane consisting of a compressed pellet comprising a mixture of finely divided gold as the conductive matrix material distributed through a salt containing ions to which the assembly is sensitive, such as silver chloride when chloride ions are detected, is disclosed. In the ion-sensitive electrode assembly the membrane is exposed at one surface to the solution in which the electrode is immersed and the selected ion content thereof is to be measured, the other surface being in contact with an occluded electrolyte in which a contact wire is immersed to provide a fixed contact potential. The ion-sensitive electrode and a standard reference electrode are both contacted with the solution of ions to be measured and are connected to a potential measuring device such as a voltmeter.

BACKGROUND OF THE INVENTION

This invention relates to electrode assemblies for measuring the quantities of preselected ions in solution and more particularly to the membranes of such electrodes which contain an electroconductive matrix material and another material that is selected according to the nature of the ion to which the assembly is to be responsive.

The term "membrane" is used herein in the customary potentiometric electrode technology sense, generally regardless of its flexibility or curvature, as providing a pair of surfaces between which ionic charge transfer is effected.

The measurement of ions by selective electrochemical techniques using membrane materials which are selectively sensitive to a certain species of ions to the exclusion or substantial exclusion of other ions are already known. Usually electrodes are employed having a reversible Nernstian potential with respect to the ions to be measured. Such electrodes conventionally include an elongated hollow body of an insoluble impervious insulating material closed at one end by an ion selective membrane, typically in the form of a compressed pellet. Within the hollow body is contained a reference electrolyte solution of a soluble salt of the ion to be measured such as a 0.1 M aqueous solution of potassium chloride saturated with silver chloride and a conducting wire, of silver or silver coated with silver chloride, immersed in the solution. The wire is connected to a cable, preferably optionally shielded, and then connected to a sensitive millivoltmeter. A reference electrode is also connected to the millivoltmeter and, together with the measuring electrode, the Nernstian potential caused by ions in a solution in which the measuring electrode and the reference electrode are both contacted is detected and measured. A typical halide-sensitive electrochemical electrode and measuring apparatus are described in U.S. Pat. 3,563,874. Other electrode assemblies are described in U.S. Pat. 3,442,782 and D. 185,714.

The measurement of ions in solution using the foregoing types of apparatus is described in U.S. Pat. 3,431,182 in which an electrode assembly is described having an imporous membrane of crystalline fluoride substantially insoluble in water. When connected to the appropriate voltmeter the concentration of dissolved fluorides in drinking water, for example, is measured using electrochemical techniques, thus the electrode assemblies find practical applicability to a number of ion analysis situations.

At the heart of the electrode assembly is the ion selective membrane, commonly termed a "pellet" which connotes its method of manufacture. The ideal membrane or pellet must have a number of properties in order to be maximumly effective and fully functional. First, the pellet should be impervious to the reference electrolyte contained in the electrode as well as to the solution that is being tested. Secondly, the pellet should be chemically inert to the ion contained in both the reference electrolyte solution of fixed potential on one side thereof and the ions contained in the solution to be measured. Also the pellet should contain, along with an electroconductive matrix, a salt (a compound having a positive metal ion and a negative nonmetal ion) that is specific to the ions to which the electrode is to detect. For example, to detect $Cu^{++}$, $Cd^{++}$, $Pb^{++}$ and $SCN^-$ ions the corresponding compounds mixed with the matrix material are respectively CuS, CdS, PbS and AgSCN.

Traditionally the pellet or membrane is made by compressing a powdered salt mixture of the above materials under high pressures, however, since the salts that are used are normally quite soft, the resulting compressed pellet has rather poor mechanical strength. The mechanical strength of the pellet is important since in practice the electrodes are subjected to frequent mechanical handling and may be used with corrosive or abrasive solutions.

In another known form of an ion-selective electrode silver chloride as the conductive matrix material is mixed with a compound that is selected according to the nature of the ion to which the electrode is to be responsive. However, electrodes of this type also suffer from serious disadvantages in that the silver chloride, especially in the quantities used, is highly sensitive to light, so that the potential obtained from these electrodes is necessarily dependent upon the light conditions at the time the measurement is taken, thus introducing a further undesirable variable into the measuring technique. When using silver chloride as the matrix material the light conditions must be carefully controlled. Resistivity of the silver chloride and the salts mixed therewith is quite high, which results in a high internal resistance in the electrode and requires the use of a millivoltmeter with an extremely high input resistance but at the expense of accuracy and stability.

Other suggestions have been to use, along with the electroconductive matrix material, finely divided silver. Thus the pellet would contain silver sulfide and elemental sliver plus the salt of the species of ions to be detected. While the mechanical properties of such an electrode are improved and internal resistance is lowered, another complication is introduced. Elemental silver in the pellet causes the generation of substantial redox potentials which tends to make the electrode drifty and susceptible to interferences from redox couples that might exist in the solutions being tested. Free metals in ion-elective membranes are discussed in U.S. Pat. 3,591,464 column 2, lines 17–21. Unless the redox potentials thus generated can be managed, silver metal containing membranes have only a narrow range of application, depending on the nature of the ions in the solution to be measured.

Another proposal has been to construct a pellet containing silver sulfide as the electroconductive matrix material, mixed and compressed with another compound or salt selected according to the nature of the ion to which the electrode is to be sensitive. These electrode structures are substantially free from elemental metals such as silver and are described in U.S. Pat. 3,591,464 and they have better mechanical properties and lower internal resistance without the disadvantage of increased redox potentials.

However, the internal resistance of these electrodes remains higher than desirable. Improvement in internal resistance by decreasing same by a significant amount makes possible the use of a millivoltmeter with a lower input resistance, the range over which the millivoltmeter operates being a smaller one, hence the overall measuring apparatus is subject to a lower degree of variation and is more stable.

Accordingly, it is the object of the present invention to provide an ion-selective membrane or pellet for an electrode assembly to detect and measure ionic activity in solution, wherein the electrode assembly has a lower internal resistance than previously known electrodes yet exhibiting the desirable properties of good mechanical strength, stability, and accuracy, with relative insensitivity to light yet with decreased settling times.

DETAILED DESCRIPTION OF THE INVENTION

According to the present invention an electrode assembly for selectively measuring ions in solution is provided having an ion selective substantially imporous membrane therein consisting of a pellet compressed from an intimate and substantially uniform mixture of finely divided gold as the electroconductive matrix and a compound selected according to the species of ions for which the electrode is to be sensitive.

The compound or salt that is selected depends upon the response desired by the electrode and the ion in solution to which the element is to be responsive. For example, if the electrode is to be used for measuring chloride ions, then the salt selected is silver chloride. On the other hand silver bromide would be used for measuring bromide ions. Similarly, silver iodide is used for measuring solutions of iodide ions, silver sulfide is used for measuring sulfide and silver ions, silver thiocyanate is used for measuring thiocyanate ions, silver cyanide or silver iodide are used for measuring cyanide ions, cadmium sulfide is used for measuring cadmium ions, cupric sulfide is used for measuring cupric ions and lead sulfide is used for measuring lead ions.

Figure 1:
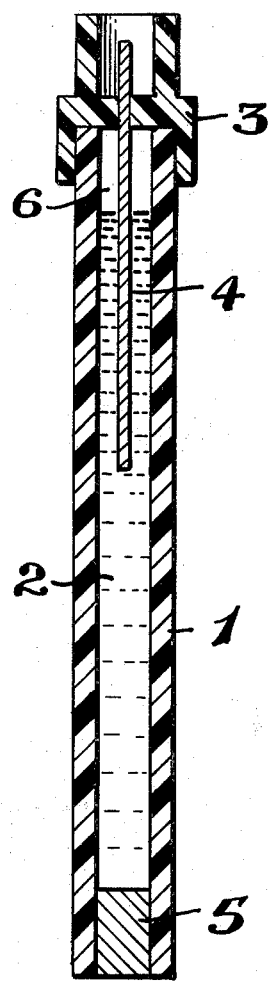
FIG. 1 is a side-elevational cross-sectional view of an electrode assembly according to the present invention.

In FIG. 1 the electrode assembly consists of a tubular body 1 of a dielectric insulating material that is substantially rigid yet inert or substantially inert, insoluble and impervious both to the electrolytes contained therein and the solution in which the lower portion of the electrode assembly is to be immersed.

Suitable materials from which tubular body 1 may be fabricated include polytetrafluoroethylene (Teflon), epoxy resin, unplasticized (poly)vinyl chloride, glass or a similar inert, impervious material. The electrolyte 2 contained within tubular body 1 is an aqueous solution of a reference electrolyte containing a soluble salt of the ion to be detected. Thus when chloride ions are to be measured the reference electrolyte is a 0.1 M aqueous solution of potassium chloride saturate with silver chloride. Other aqueous electrolyte solutions known in the art may, of course, be used. The electrolyte maintain a substantially fixed potential.

The tubular body 1 is shown in its vertical position, the electrolyte 2 contained therein in fluid and electrolytic communication with one surface of the ion selective membrane or pellet 5, which seals the lower end of the tube. Pellet 5 may be secured to the lower end of the tube by any convenient means, although it is illustrated in FIG. 1 and shown in more detail in FIG. 2 as a barrier or plug. The construction of the membrane 5 is described in more detail below.

At the upper end of the tube 1 a cap or seal 3, preferably made from the same or similar insulating material as the tube is attached to the tube and seals the electrolyte in the tube. Through the cap 3 a wire 4 extends into the electrolyte 2. The other end of the wire is electrically connected to a coaxial cable (not shown), the central cable conductor connected to the internal reference electrolyte while the peripheral or outside conductor which is optional provides an electro-static shield. Thus the lower portion of wire 4 picks up the potential that is present in electrolyte 2 and the potential then passed to a suitable detecting means such as a millivoltmeter.

The ion-sensitive electrode, as described above, and a standard reference electrode are both connected to a high-input impedance voltmeter. Standard reference electrodes are commonly used in the art and are not illustrated herein, however, they typically consist of a glass shield containing a silver-silver chloride electrode in a saturated potassium chloride-silver chloride solution and separated by a ceramic junction from the soluiton to be measured. The structure of a typical standard electrode and the operation of an ion-sensitive electrode generally with a reference electrode and a potential measuring device are well known in the art and described in greater detail in U.S. Pats. 3,341,182 and 3,591,464, the disclosures of which are hereby incorporated by reference.

At least the lower portion of wire 4 consists of an elemental metal such as silver or platinum and optionally coated with a salt of the corresponding metal, such as silver chloride in the case of a silver. When a platinum wire is used it too may be coated with silver chloride. Of course, the entire wire 4 needs not to be of silver or platinum but may be a conducting metal wire coated with silver or platinum. A silver metal-silver chloride coated wire is preferred. Wire 4 provides means for electrically contacting the face of pellet 5 with electrolyte 2 at a substantially stable of fixed potential.

Figure 2:
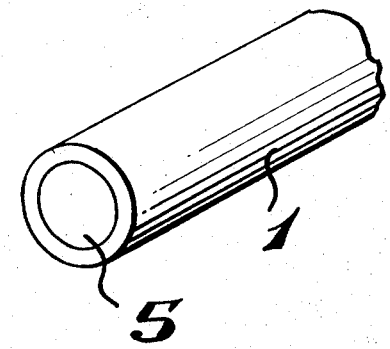
FIG. 2 is a perspective view of the lower end portion of the electrode assembly of FIG. 1 showing the ion selective membrane of the present invention in more detail.

FIG. 2 shows in more detail pellet 5 placed within tube 1 and having the surface thereof exposed to the ionic solution to be measured. The other surface of the membrane 5 is exposed to the electrolyte solution 2 contained within tube 1. The membrane or pellet is secured to and seals the tube, as for example by cement. Of course, other arrangements may be used to secure the membrane to the tube as the particular method of attachment is not important to the present invention.

Pellet 5 is an ion selective membrane that consists of a solid substantially imporous membrane having at least one surface adapted to contact a solution of ions and is compressed from a finely divided, substantially uniform mixture of gold, for increasing the conductivity and improving the mechanical properties of the membrane, and a compound or salt adapted to the species of the ions in solution to be measured. These compounds may include silver chloride, silver bromide, silver iodide, silver sulfide, silver thiocyanate, cadmium sulfide, lead sulfide and cupric sulfide for measuring respectively chloride ions, bromide ions, iodide ions, sulfide ions, thiocyanate ions, cadmium ions, lead ions and cupric ions. Either silver cyanide or silver iodide may be used for measuring cyanide ions.

The mixture of gold and the compound selected is sufficiently compressed so as to render the pellet at least substantially impervious. No particular size, configuration or thickness need be observed as these factors will depend on the size and construction of the electrode, the materials selected as well as other considerations. A typical pellet size is about 5 mm. in diameter and about 6 mm. in overall thickness. Conveniently an air space above the electrolyte 2 is provided in the assembly to allow for thermal expansion and contraction.

The amount of gold incorporated into the membrane may range from between about 1 and 50 mole percent, depending on the salt added to the mixture adapted to the ions to be measured, the balance of the material being ion-specific compound selected as described above, the total amounting to 100 mole percent.

Example: In the case of chloride ions the amount of gold incorporated into the membrane may range preferably between 5 and 20 mole percent.

The most desirable proportions and ranges of rations of gold and the compound selected will depend, inter alia, upon the nature and concentration of the ions to be detected, the particular compound or salt selected, the sensitivity of the millivoltmeter and other factors. An appropriate molar ratio is readily determined by one skilled in the art.

The present invention may take the form of a number of different embodiments not expressly described herein, however, in all instances, the ion selective membrane will be characterized as containing finely divided gold therein.

The invention will be further illustrated by the following examples. Unless otherwise indicated all parts and percentages are by weight.

EXAMPLES

Internal Resistance—Comparative Studies

As indicated above, it is desirable to reduce or eliminate the generation of redox potentials and to decrease settling times of the electrode assembly of the type described. Elimination of redox potentials in particular provides for more accurate readings and the gold containing electrodes can be used in strong reducing or oxidizing solutions.

An electrode pellet consisting of a mixture of silver sulfide and silver chloride, with a molar ratio of 10:90 and having a diameter of 5 mm. was made and found to generate a redox potential of 110 mv. Similar pellets were made using other salts and the redox potentials of these silver sulfide containing pellets were found to range from between 100–300 mv.

As described above, the silver and silver sulfide were replaced with a like quantity of gold and having the same dimensions as before, but made according to the present invention and was found to generate no redox potential.

Similar pellets were made with other salts and the generated redox potential of the gold-containing pellets were found to range from between 0–20 mv.

The difference in redox potential between electrodes having silver or silver sulfide membranes and gold membranes was an improvement factor of up to 10 times. Thus, using the gold containing electrode it is possible to measure solutions that have strong reducing or strong oxidizing properties.

Preparation of Ag-AgCl chloride ion measuring electrode

An electrode assembly was prepared in the manner illustrated in FIG. 1 having as a membrane a compressed pellet 5 mm. in diameter and 6 mm. in overall thickness. The pellet was pressed from a powder containing 90 mole percent of AgCl and 10 mole percent of finely divided gold and compressed under a pressure of 3 metric tons. Above the membrane and contained in the tube was a 0.1 M aqueous solution of potassium chloride saturated with silver chloride. The internal resistance of the silver chloride electrode was 600 k. Ohms.

The electrode was connected to a millivoltmeter and a reference electrode and used to measure the Cl⁻ content of a number of aqueous KCl solution of different but precisely serially diluted concentrations. Typical cell potentials were as follows for the various concentrations:

| Conc. of Cl⁻ in moles/liter | Response in mV. | Settling time (sec.) |
|---|---|---|
| $1 \times 10^0$ | 26 | 30 |
| $1 \times 10^{-1}$ | 85 | 16 |
| $1 \times 10^{-2}$ | 144 | 5 |
| $1 \times 10^{-3}$ | 203 | 1 |
| $1 \times 10^{-4}$ | 263 | 1 |
| $1 \times 10^{-5}$ | 321 | 2 |
| $1 \times 10^{-6}$ | 375 | 10 |

No significant differences were noted in the measurements when made in a dark or lighted environment.

To the above solutions no significant response was observed when a solution of 0.1 M $KMnO_4$ having a pH of 3 was added, thus demonstrating the accuracy of the gold-type pellet in highly diluted solutions while resisting change from extreme drops in pH and great change in redox properties of the solution.

We claim:

1. An electrode assembly selectively sensitive to ions in solution comprising a solid substantially imporous membrane which consists essentially of an intimate mixture of a substantial amount of finely divided gold and a compound sensitive to the ions in solution selected from the group consisting of silver chloride, silver bromide, silver iodide, silver cyanide, silver sulfide, silver thiocyanate, cupric sulfide, cadmium sulfide and lead sulfide, a second surface in contact with an occluded electrolyte and means for forming an electrical contact with said second surface at a substantially fixed potential.

2. The electrode as claimed in claim 1 wherein said gold is present in an amount of from about 1 to about 50 mole percent.

3. The electrode as claimed in claim 1 wherein the compound is silver chloride.

4. The electrode as claimed in claim 1 wherein the compound is silver bromide.

5. The electrode as claimed in claim 1 wherein the compound is silver iodide.

6. The electrode as claimed in claim 1 wherein the compound is silver cyanide.

7. The electrode as claimed in claim 1 wherein the compound is silver sulfide.

8. The electrode as claimed in claim 1 wherein the compound is silver thiocyanate.

9. The electrode as claimed in claim 1 wherein the compound is cupric sulfide.

10. The electrode as claimed in claim 1 wherein the compound is cadmium sulfide.

11. The electrode as claimed in claim 1 wherein the compound is lead sulfide.

12. In an electrode assembly for potentiometric determination of the activity of ions in solution, an element sensitive to selected ions and comprising a solid, substantially imporous membrane having a first surface thereof adapted to contact said solution, said surface comprising a mixture of electroconductive matrix material and a compound sensitive to the ions in solution selected from the group consisting of silver chloride, silver bromide, silver iodide, silver cyanide, silver sulfide, silver thiocyanate, cupric sulfide, cadmium sulfide, and lead sulfide and a second surface in contact with an occluded electrolyte, the improvement wherein said electroconductive matrix material is finely divided gold present in an mole percentage of from about 1 to about 50 percent.

13. In a potentiometric system for measuring the activity of ions in solution with a reference electrode and an ion-sensitive electrode both adapted to contact the solution to be measured and connected to a potential measuring device, the ion-sensitive electrode including as the ion-sensitive element thereof a solid substantially imporous membrane having a first surface adapted to contact the solution to be measured and a second surface in contact with an occluded electrolyte, the improvement wherein the membrane consists essentially of an intimate mixture of a substantial amount of finely divided gold with a compound sensitive to the ions to be measured, said compound selected from the group consisting of silver chloride, silver bromide, silver iodide, silver cyanide, silver sulfide, silver thiocyanate, cupric sulfide, cadmium sulfide and lead sulfide.

14. A system as claimed in claim 13 wherein the compound sensitive to the ions in solution to be measured is silver chloride.

15. A system as claimed in claim 13 wherein the compound sensitive to the ions in solution to be measured is silver iodide.

16. A system as claimed in claim 13 wherein the compound sensitive to the ions in solution to be measured is silver bromide.

17. A system as claimed in claim 13 wherein the compound sensitive to the ions in solution to be measured is silver cyanide.

18. A system as claimed in claim 13 wherein the compound sensitive to the ions in solution to be measured is silver sulfide.

19. A system as claimed in claim 13 wherein the compound sensitive to the ions in solution to be measured is silver thiocyanate.

20. A system as claimed in claim 13 wherein the compound sensitive to the ions in solution to be measured is cupric sulfide.

21. A system as claimed in claim 13 wherein the compound sensitive to the ions in solution to be measured is cadmium sulfide.

22. A system as claimed in claim 13 wherein the compound sensitive to the ions in solution to be measured is lead sulfide.

23. A system as claimed in claim 13 wherein said gold is present in an amount of from about 5 to about 95 mole percent.

References Cited
UNITED STATES PATENTS

| Patent No. | Date | Name | Class |
|---|---|---|---|
| 3,442,782 | 5/1969 | Shiller et al. | 204—195 M |
| 3,591,464 | 7/1971 | Frant et al. | 204—195 M |
| 3,431,182 | 3/1969 | Frant | 204—1 T |
| 3,563,874 | 2/1971 | Ross et al. | 204—195 M |
| 3,669,862 | 6/1972 | Hirata et al. | 204—195 M |
| 3,574,078 | 4/1971 | Hynes et al. | 204—195 P |
| 3,510,420 | 5/1970 | Mills | 204—195 P |
| 3,708,412 | 1/1973 | Lofgren | 204—195 P |
| 3,607,710 | 9/1971 | Farren et al. | 204—195 M |

TA-HSUNG TUNG, Primary Examiner

U.S. Cl. X.R.

204—1 T